(12) United States Patent
Äärilä et al.

(10) Patent No.: US 7,416,686 B2
(45) Date of Patent: Aug. 26, 2008

(54) POLYMER COMPOSITION FOR PIPES

(75) Inventors: Jari Äärilä, Porvoo (FI); Mats Bäckman, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 919 days.

(21) Appl. No.: 10/257,578

(22) PCT Filed: Mar. 21, 2001

(86) PCT No.: PCT/EP01/03243

§ 371 (c)(1),
(2), (4) Date: Dec. 30, 2002

(87) PCT Pub. No.: WO01/79345

PCT Pub. Date: Oct. 25, 2001

(65) Prior Publication Data

US 2003/0096901 A1    May 22, 2003

(51) Int. Cl.
*C08L 23/00*    (2006.01)
*C08F 10/02*    (2006.01)
*H01B 9/00*    (2006.01)

(52) U.S. Cl. .................. 252/500; 524/515; 525/240
(58) Field of Classification Search ................ 252/500; 524/515; 525/240
See application file for complete search history.

(56) References Cited

U.S. PATENT DOCUMENTS 5,306,775 A      4/1994  Martin et al.
6,329,054 B1 *  12/2001  Rogestedt et al. ........... 428/378

FOREIGN PATENT DOCUMENTS

| DE | 198 49 426 A1 | 5/2000 |
| WO | WO 99/57193 | 11/1999 |
| WO | WO 00/01765 | 1/2000 |
| WO | WO 00/22040 | 4/2000 |

* cited by examiner

*Primary Examiner*—Ana L Woodward
(74) *Attorney, Agent, or Firm*—Fay Sharpe LLP

(57) ABSTRACT

Pipes having a design stress of at least 9.0 MPa are produced by using a new bimodal polyethylene composition of particular properties compounded with carbon black.

10 Claims, No Drawings

POLYMER COMPOSITION FOR PIPES

The present invention relates to a multimodal polymer composition for pipes and to pipes prepared therefrom.

Nowadays, pipes of polymer material are frequently used for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 50° C. Such pressure pipes are preferably made of polyolefin plastic, usually unimodal ethylene plastic such as medium density polyethylene (MDPE; density: 0.930-0.942 g/cm$^3$) and high density polyethylene (HJPE; density: 0.942-0.965 g/cm$^3$). By the expression "pressure pipe" herein is meant a pipe which, when used, is subjected to a positive pressure, i.e. the pressure inside the pipe is higher than the pressure outside the pipe.

Polymer pipes are generally manufactured by extrusion, or, to a smaller extent, by injection moulding. A conventional plant for extrusion of polymer pipes comprises an extruder, a die-head, a calibrating device, cooling equipment, a pulling device, and a device for cutting or for coiling-up the pipe.

The manufacture of PE materials to be used in pressure pipes is discussed in an article by Scheirs et al (Scheirs, Böhm, Boot and Leevers: PE100 Resins for Pipe Applications, TRIP Vol. 4, No. 12 (1996) pp 408-415). The authors discuss the production technology and properties of PE100 pipe materials. They point out the importance of proper comonomer distribution and molecular weight distribution to optimise the slow crack growth and rapid crack propagation.

EP 739937 A2 discloses a pipe made of a bimodal PE resin, having specified stress cracking resistance, impact strength and stiffness, and that the material should preferably have an MFR$_5$ not higher than 0.35 g/10 min.

The properties of conventional polymer pipes are sufficient for many purposes, although enhanced properties may be desired in applications requiring high pressure resistance, e.g. pipes that are subject to an internal fluid pressure for a long and/or short period of time. As examples of properties which it is desirable to improve may be mentioned processability, impact strength, modulus of elasticity, rapid crack propagation resistance, slow crack growth resistance, and the design stress rating of the pipe.

It is currently possible to reach a design stress of 8.0 MPa by using PE100 materials. A stronger PE material, suitable for design stresses of 9.0 MPa (PEI 112), or even 10.0 (PE125) would be very desirable.

The problem has been that when increasing the density of bimodal polyethylene to achieve a higher design stress the slow crack growth properties have been lost. However it has now become possible to produce a material which has very good slow crack growth properties (even at higher stresses) in combination with extrudability, without excessive amounts of gels and with a maintained RCP level.

It has now been discovered that it is possible to reach a design stress of 9.0 MPa (PE112), or even 10.0 MPa (PE125), when the pipe comprises a composition including 92-99% by weight of a particular bimodal ethylene polymer and 1-8% by weight of carbon black.

According to the present invention a polymer composition for the manufacture of pipes having a design stress of at least 9.0 MPa (PEI 12) comprises 92-99% wt of a bimodal ethylene polymer and 1-8% wt of carbon black, said composition being characterised by having MFR$_5$ in the range 0.15 to 0.40 g/10 min and a density in the range 955 to 965 kg/m$^3$, said polymer being composed of 42-55% wt of a low molecular weight ethylene homopolymer having MFR$_2$ in the range 350 to 1500 g/10 min and 58-45% wt of a high molecular weight copolymer of ethylene with 1-hexene, 4-methyl-1-pentene, 1-octene and/or 1-decene.

Advantageously the composition has a design stress of at least 10.0 MPa (PE125).

The carbon black may be introduced into the composition in the form of a "master batch" containing 20-60, typically 30-50, preferably 35-45% wt carbon black in admixture with other components, suitably an ethylene polymer.

In a favoured embodiment the composition is one in which the density of the polymer, before compounding with the carbon black, is at least 953 kg/m$^3$, and in which the value of FRR$_{21/5}$ in the composition including the carbon black is at least 38.

The invention further comprehends pipes manufactured from the aforesaid composition.

The composition of the present invention is made from a specific bimodal polyethylene. This is in contrast to prior art polyethylene pipes which usually are made of unimodal polyethylene, or from bimodal polyethylene which does not have the specified molecular weight distribution and composition of the polyethylene of the present invention.

The "modality" of a polymer refers to the form of its molecular weight distribution curve, i.e. the appearance of the graph of the polymer weight fraction as function of its molecular weight. If the polymer is produced in a sequential step process, utilising reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

By properly selecting the different polymer fractions and the proportions thereof in the multimodal polyethylene a pipe with processability, good slow crack growth resistance, rapid crack propagation resistance, and a high design stress rating is obtainable.

The pressure pipe composition of the present invention is a multimodal polyethylene, preferably a bimodal polyethylene. The multimodal polyethylene comprises a low molecular weight (LMW) ethylene homopolymer fraction and a high molecular weight (HMW) ethylene copolymer fraction. Depending on whether the multimodal polyethylene is bimodal or has a higher modality the LMW and HMW fractions may comprise only one fraction each or include sub-fractions, i.e. the LMW may comprise two or more LMW sub-fractions and similarly the HMW fraction may comprise two or more HMW sub-fractions. It is a characterising feature of the present invention that the LMW fraction is an ethylene homopolymer and that the HMW fraction is an ethylene copolymer, i.e. it is only the HMW fraction that includes a comonomer. As a matter of definition, the expression "ethylene homopolymer" used herein relates to an ethylene polymer that consists substantially, i.e. to at least 97% by weight, preferably at least 99% by weight, more preferably at least 99.5% by weight, and most preferably at least 99.8% by weight of ethylene and thus is an HD ethylene polymer which preferably only includes ethylene monomer units. Preferably, the lower limit of the molecular weight range of the HMW fraction is 3500, more preferably 4000, which means that almost all ethylene copolymer molecules in the multimodal polyethylene pipe composition of the invention have a molecular weight of at least 3500, preferably at least 4000. This preferred lower limit of the HMW fraction gives a pressure pipe with enhanced strength.

In the present invention it is further important that the proportions of the LMW and HMW fractions (also known as the "split" between the fractions) are selected properly. More particularly, the weight ratio of the LMW fraction to the HMW fraction preferably lies in the range (42-52):(58-48), more preferably (44-50:(56-50). If the proportion of the HMW fraction becomes too great it results in too low strength values and if it is too low it results in an unacceptable formation of gels.

The pipe according to the present invention has a slow crack propagation resistance of at least 1000 hours, preferably at least 1200 hours, and in particular 1400 hours at 4.6 MPa hoop stress at 80° C. temperature and at least 800 hours, preferably at least 900 hours and in particular at least 1000, hours at 4.9 MPa hoop stress at 80° C. temperature. In addition, the composition which the pipe has been made of has a Charpy impact strength at 0° C. of at least 10 kJ/m$^2$, preferably of at least 12 kJ/m$^2$ and in particular of at least 15 kJ/m$^2$. Moreover, the critical temperature of the pipe is no higher than −7° C., preferably no higher than −9° C. and in particular no higher than −10° C.

The pipe is preferably formed from a composition comprising 97.0-98.5% by weight of the bimodal ethylene polymer and 1.5-3.0% by weight of carbon black. The composition preferably has MFR$_5$ between about 0.20 and 0.35 g/10 min and density between about 958 and 963 kg/m$^3$ Preferably, the bimodal ethylene polymer is produced in a multistage process. In particular, a process comprising a cascade of a loop reactor and a gas phase reactor is preferred, the polymerisation taking place in the presence of a Ziegler-Natta catalyst as disclosed in WO 99/51646.

The melt flow rate (MFR), which is equivalent to the term "melt index" previously used, is an important property of the multimodal polyethylene for pipes according to the invention. The MFR is determined according to ISO 1133 and is indicated in g/10 min. The MFR is an indication of the flowability, and hence the processability, of the polymer. The higher the melt flow rate, the lower the viscosity of the polymer. The MFR is determined at different loadings such as 2.1 kg (MFR$_{2.1}$; ISO 1133, condition D) or 5 kg (MFR$_5$; ISO 1133, condition T). At the present invention the multimodal polyethylene should have an MFR$_5$ of 0.1-1.0 g/10 min, preferably 0.15-0.8 g/10 min.

The quantity FRR (flow rate ratio) is an indication of molecular weight distribution and denotes the ratio of flow rates at different loadings. Thus, FRR$_{21/5}$ denotes the value of MFR$_{21}$/MFR$_5$.

Another characterising feature of the compositions of the present invention is their density. For reasons of strength the density lies in the medium to high density range, more particularly in the range 0.955 to 0.965 g/cm$^3$. The pressure pipes of medium density multimodal polyethylene are somewhat more flexible than pressure pipes of high density multimodal polyethylene and may therefore more easily be coiled into a roll. On the other hand it is possible to obtain pressure pipes of a higher design stress rating with high density multimodal polyethylene than with medium density multimodal polyethylene.

It should be noted that the composition of the present invention is characterised not by any single one of the above defined features, but by their combination. By this unique combination of features it is possible to obtain pressure pipes of superior performance, particularly with regard to design stress, processability, rapid crack propagation (RCP) resistance, design stress rating, impact strength, and slow crack propagation resistance.

The processability of a pipe (or rather the polymer thereof) may be determined in terms of the number of screw revolutions per minute (rpm) of an extruder for a predetermined output of pipe in kg/h, but also the surface appearance of the pipe is then important.

The rapid crack propagation (RCP) resistance of a pipe may be determined according to a method called the S4 test (Small Scale Steady State), which has been developed at Imperial College, London, and which is described in ISO 13477:1977 (E). According to the RCP-S4 text a pipe is tested, which has an axial length now below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$) i.e. the ductile brittle transition temperature as measured according to ISO 13477:1997(E) is the lowest temperature at which the pipe passes the test. The lower the critical temperature the better, since it results in an extension of the applicability of the pipe. It is desirable for the critical temperature to be around −5° C. or lower. A pressure pipe made of the multimodal polymer composition according to the present invention preferably has an RCP-S4 value of −1° C. (minimum requirement for an MD PE80 pipe) or lower, more preferably −4° C. (minimum requirement for an HD PE80 pipe) or lower, and most preferably −7° C. (minimum requirement for an HD PE100 pipe) or lower.

The design stress rating is the circumferential stress a pipe is designed to withstand for 50 years without failure and is determined for different temperatures in terms of the Minimum Required Strength (MRS) according to ISO/TR 9080. Thus, MRS8.0 means that the pipe is a pipe withstanding a hoop stress of 8.0 MPa gauge for 50 years at 20° C., and similarly MRS10.0 mans that the pipe withstands a hoop stress of 10 MPa gauge for 50 years at 20° C. In a similar fashion, MRS11.2 means that the pipe withstands a hoop stress of 11.2 MPa gauge for 50 years at 20° C. and MRS12.5 means that the pipe withstands a hoop stress of 12.5 MPa gauge for 50 years at 20° C. A pressure pipe according to the invention has an MRS rating of at least MRS11.2

The impact strength is deteriemnd as Charpy Impact Strength according to ISO 179. A pressure pipe made of the polymer composition according to the present invention preferably has an impact resistance at 0° C. of at least 10 kJ/m², more preferably at least 12 k/m², and most advantageously at least 15 kJ/m².

The slow crack propagation resistance is determined according to ISO 13479:1997 in terms of the number of hours the pipe withstands a certain pressure at a certain temperature before failure. A pressure pipe made of the polymer composition according to the present invention has a slow crack propagation resistance of at least 1000 hours, preferably at least 1200 hours, and in particular 1400 hours at 4.6 MPa hoop stress at 80° C. temperature and at least 800 hours, preferably at least 900 hours and in particular at least 1000 hours at 4.9 MPa hoop stress at 80° C. temperature.

The modulus of elasticity is determined according to ISO 527-2 (with test specimen 1 B). A pressure pipe made of the polymer composition according to the present invention preferably has a modulus of elasticity of at least 800 MPa, more preferably at least 950 MPa, and most preferably at least 1100 MPa.

A pressure pipe made of the multimodal polymer composition of the present invention is prepared in a conventional manner, preferably by extrusion in an extruder, a technique well known to the skilled person.

It is previously known to produce multimodal, in particular bimodal, olefin polymers, such as multimodal polyethylene, in two or more reactors connected in series, for instance from EP-A-517,868, which is hereby incorporated by way of reference as regards the production of multimodal polymers.

In the production of polymers to be used in the present invention, the main polymerisation stages are preferably carried out as a combination of slurry polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor. Optionally and advantageously, the main polymerisation stages may be preceded by prepolymerisation, in which case up to 20% by weight, preferably 1-10% by weight, more preferably 1-5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product begin obtained in the end. Generally, this technique results in a multimodal polymer mixture through polymerisation with the aid of a Ziegler-Natta or metallocene catalyst in several successive polymerisation reactors. Chromium catalysts are not preferred. In the production of a bimodal polyethylene a first ethylene polymer is produced in a first reactor under appropriate conditions with respect to hydrogen-gas concentration, temperature, and pressure. After the polymerisation in the first reactor, the polymer including the catalyst is separated from the reaction mixture and transferred to a second reactor, where further polymerisation takes place under appropriate conditions. Usually, a first polymer of high melt flow rate (low molecular weight, LMW) and with no addition of comonomer is produced in the first reactor, whereas a second polymer of low melt flow rate (high molecular weight, HMW) and with addition of comonomer is produced in the second reactor. As comonomer of the HMW fraction various alpha-olefins selected from 1-hexene, 4-methyl-1-pentene, 1-octene and 1-decene are used. The amount of comonomer is preferably such that it comprises 0.1-2.0 mol %, more preferably 0.1-1.0 mol % of the bimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture.

It is also preferred that the bimodal polymer mixture be produced by polymerisation as above under different polymerisation conditions in two or more polymerisation reactors connected in series. Owing to the flexibility with respect to reaction conditions thus obtained, it is most preferred that the polymerisation is carried out in a loop reactor/gas-phase reactor. Preferably, the polymerisation conditions in the preferred two-stage method are so chosen that a comparatively low-molecular polymer having no content of comonomer is produced in one stage, preferably the first stage, owing to a high content of chain-transfer agent (hydrogen gas), whereas a high-molecular polymer having the aforesaid content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 92-98° C. more preferably about 95° C., and the temperature in the gas-phase reactor preferably is 75-90° C., more preferably 82-87° C.

A chain-transfer agent, preferably hydrogen, is added as required to the reactors, and preferably 200-800 moles of $H_2$/kmoles of ethylene are added to the reactor, when the LMW fraction is produced in this reactor, and 0-50 moles of $H_2$/kmoles of ethylene are added to the gas phase reactor when this reactor is producing the HMW fraction.

As indicated earlier, the polymerisation catalyst is preferably a Ziegler-Natta type catalyst. Particularly preferred are catalysts with a high overall activity as well as a good activity balance over a wide range of hydrogen partial pressures. Furthermore, the molecular weight of the polymer produced by the catalyst is of great importance. As an example of a preferred catalyst may be mentioned the catalyst disclosed in WO 99/51646. It has surprisingly been found that when using this catalyst in a multistage process, it is possible to obtain the polymer having the characteristics described above. This catalyst also has the advantage that the catalyst (procatalyst and cocatalyst) only needs to, and indeed only should, be added in the first polymerisation reactor.

Although the invention has been described above with reference to a specified polyethylene, it should be understood that this polyethylene may include various additives such as fillers, etc. as is known and conventional in the art.

Some additives may have a significant effect on the properties of the polymer. Thus, the density of the carbon black-containing polymer is typically significantly higher than the density of the reactor product.

Furthermore, the pipe made of the polyethylene composition according to the invention may be a single-layer pipe, or may form part of a multilayer pipe including further layers of other pipe materials.

The invention will now be illustrated by way of non-limiting examples of preferred embodiments in order further to facilitate its understanding. All parts specified therein are by weight unless explicitly otherwise indicated.

EXAMPLES

Example 1

Preparation of the Catalyst

Complex Preparation 8.6 g (66.4 mmol) of 2-ethyl-1-hexanol was added slowly to 27.8 g (33.2 mmol) of a 19.9% wt solution of butyl octyl magnesium. The reaction temperature was kept under 35° C. This complex was used in catalyst preparations. The molar ratio of 2-ethyl-1-hexanol to butyl octyl magnesium was 2:1.

Catalyst Preparation 3.7 g (1.0 mmol/g carrier) of 20% ethyl aluminium dichloride was added to 5.9 g of Sylopol 5510 silica/MgCl$_2$ carrier and the mixture was stirred for one hour at 30° C. 5.7 g (0.9 mmol/g carrier) of complex prepared according to "Complex preparation" was added and the mixture was stirred for 4 hours at 35-45° C. 0.6 g (0.55 mmol/g carrier) of TiCl$_4$ was added and the mixture was stirred for 4 hours at 35-45° C. The catalyst was dried at 45-80° C. for 3 hours. The composition of the catalyst obtained was: Al, 1.8%, Mg 3.9%, Cl 18.5%.

Example 2

Into a 50 dm$^3$ loop reactor was added 7.0 g/h of catalyst prepared according to Example 1, 2 kg/h ethylene, 20 kg/h propane and 1 g/h hydrogen. The operating temperature was 80° C. and operating pressure 65 bar.

The slurry was taken out of the reactor and led into a 500 dm$^3$ loop reactor. The reactor was operated at 95° C. temperature and 61 bar pressure. Additional ethylene, propane diluent and hydrogen were continuously introduced into the reactor so that the rate of polymer production was 31 kg/h and the MFR$_2$ of the polymer was 990 g/10 min. No comonomer was fed into the loop reactor.

The slurry was continuously withdrawn from the reactor to a flash stage, where hydrocarbons were removed from the polymer. The polymer was then transferred into a gas phase reactor where the polymerisation was continued. The reactor was operated at 85° C. temperature and 20 bar pressure. Ethylene, hydrogen and 1-hexene were fed into the reactor to obtain such conditions that the rate of polymer production was 38 kg/h, MFR$_5$ of the polymer was 0.27 g/10 min and the density 0.953 kg/dm.

The polymer was then compounded with 5.7% of a Carbon Black masterbatch containing 39.5% of Carbon Black. The MFR$_5$ of the compounded material was 0.29 g/10 min and the density was 0.962 kg/dm$^3$.

The compounded material was then extruded into pipes having an external diameter of about 110 mm and wall thickness of about 10 mm.

Examples 3 and 4

Polymer preparations similar to that of Example 1 were carried out under slightly different conditions.

The polymerisation conditions of Examples 2 to 4, and the properties of the pipes manufactured from the products thereof, are summarised in Tables 1 and 2 respectively.

TABLE 1

| | Example 2 | Example 3 | Example 4 |
|---|---|---|---|
| Loop Production, kg/h | 31 | 33 | 32 |
| Loop H$_2$C$_2$, mol/kmol | 620 | 620 | 610 |
| Loop MFR$_2$, g/10 min | 990 | 1010 | 1060 |
| GPR Production, kg/h | 38 | 40 | 41 |
| GPR H$_2$/C$_2$ mol/kmol | 9 | 7 | 8 |
| GPR C$_6$/C$_2$ mol/kmol | 41 | 37 | 37 |
| MFR$_5$, powder g/10 min | 0.27 | .023 | 0.24 |
| Density, powder kg/dm$^3$ | 0.953 | 0.953 | 0.953 |
| Comonomer content, mol % | 0.37 | 0.47 | 0.34 |

TABLE 2

| | Example 2 | Example 3 | Example 4 |
|---|---|---|---|
| MFR$_5$ g/10 min | 0.33 | 0.27 | 0.22 |
| MFR$_{21}$ g/10 min | 12.5 | 11.7 | 10.0 |
| FRR$_{21/5}$ | 38 | 44 | 45 |
| Notch 4.6 MPa, 80° C. h | 1217 | 2156 | 1881 |
| Notch 4.9 MPa, 80° C. h | 1422 | 965 | 1384 |
| Pent 4.6 MPa, 80° C. h | 2569 | | 4040 |
| RCP (T$_{crit}$), ° C. | −7 | −7 | −11 |
| Impact strength, kJ/m$^2$ | 13 | 12 | 15 |
| Density kg/dm$^3$ | 0.962 | 0.960 | 0.959 |

The invention claimed is:

1. A polymer composition for the manufacture of pipes that have a design stress of at least 9.0 MPa (PE112), the polymer composition comprising 92-99% by weight of a bimodal ethylene polymer and 1-8% by weight of carbon black, said composition having an MFR$_5$ in the range of 0.15 to 0.40 g/10 min and a density in the range of 955 to 965 kg/m$^3$, said polymer being composed of 42-55% by weight of a low molecular weight ethylene homopolymer having an MFR$_2$ in the range of 350 to 1500 g/10 min and 58-45% by weight of a high molecular weight copolymer of ethylene with 1-hexene, 4-methyl-1-pentene, 1-octene and/or 1-decene.

2. A polymer composition according to claim 1 wherein the said polymer is composed of 45-50% by weight of said homopolymer and 55-50% by weight of said copolymer.

3. A polymer composition according to claim 1 wherein said MFR$_5$ range is from 0.15 to 0.30 g/10 min.

4. A polymer composition according to claim 1 wherein said copolymer has a molecular weight of at least 3500.

5. A polymer composition according to claim 1 which has a Charpy impact strength at 0° C. of at least 10 kJ/m$^2$.

6. A polymer composition according to claim 1 which comprises 97.0 to 98.5% by weight of said polymer and 1.5 to 3% by weight of carbon black.

7. A polymer composition according to claim 1 which has a density of between 958 and 963 kg/m$^3$.

8. A polymer composition according to claim 1 wherein said bimodal polymer has an MFR$_5$ of 0.1 to 1.0 g/10 min.

9. A polymer composition according to claim 1 wherein said bimodal polymer has a density of at least 953 kg/m$^3$.

10. A polymer composition according to claim 1 wherein said composition has an FFR$_{21/5}$ of at least 38.9

* * * * *